(12) United States Patent  
Dell'Erba et al.

(10) Patent No.: US 6,971,681 B2  
(45) Date of Patent: Dec. 6, 2005

(54) THREADED PIPE WITH SURFACE TREATMENT

(75) Inventors: Diego Dell'Erba, Campana (AR); Gabriel E. Carcagno, Campana (AR)

(73) Assignee: Tenaris Connections AG, (LI)

( * ) Notice: Subject to any disclaimer, the term of this patent is extended or adjusted under 35 U.S.C. 154(b) by 12 days.

(21) Appl. No.: 10/682,520

(22) Filed: Oct. 10, 2003

(65) Prior Publication Data

US 2004/0113423 A1 Jun. 17, 2004

(30) Foreign Application Priority Data

Oct. 9, 2002 (IT) .......................... RM2002A0512

(51) Int. Cl.[7] .............................................. F16L 58/18
(52) U.S. Cl. ........................ 285/55; 285/94; 285/333; 285/390
(58) Field of Search ........................... 285/94, 55, 333, 285/390

(56) References Cited

U.S. PATENT DOCUMENTS

| | | | |
|---|---|---|---|
| 3,716,348 A * | 2/1973 | Perkins ...................... 428/626 |
| 4,256,811 A | 3/1981 | Black ........................ 428/562 |
| 4,414,247 A | 11/1983 | Hubecker et al. ........... 427/230 |
| 4,474,651 A * | 10/1984 | Yauchi et al. ............... 285/329 |
| 4,506,432 A * | 3/1985 | Smith ......................... 29/458 |
| 4,527,815 A * | 7/1985 | Frick .......................... 285/55 |
| 4,630,849 A | 12/1986 | Fukui et al. ................. 285/55 |
| 4,871,194 A * | 10/1989 | Kawashima et al. ......... 285/55 |
| 5,069,761 A * | 12/1991 | Krings et al. ............... 205/183 |
| 6,027,145 A | 2/2000 | Tsuru et al. ................. 285/94 |
| 6,679,526 B2 * | 1/2004 | Yamamoto et al. .......... 285/55 |
| 2003/0066641 A1 * | 4/2003 | Yamamoto et al. ....... 166/242.6 |
| 2003/0094810 A1 * | 5/2003 | Goto et al. ................. 285/94 |

FOREIGN PATENT DOCUMENTS

| AU | 520538 B | 2/1982 | |
|---|---|---|---|
| WO | 2004/033951 | 4/2004 | .......... F16L 58/18 |

* cited by examiner

*Primary Examiner*—Eric K. Nicholson  
(74) *Attorney, Agent, or Firm*—Fitzpatrick, Cella, Harper & Scinto

(57) ABSTRACT

A threaded metallic pipe for oil extraction industry has a threaded end portion with treated surface in which the metal surface has a roughness (Ra) comprised of 2.0 $\mu$m and 6.0 $\mu$m, which is covered by a uniform layer (7) of a dry corrosion inhibiting coating and a second uniform layer (8) of dry lubricant coating. Alternatively the layers (8, 9) combined into one uniform layer (9) of a dry corrosion inhibiting coating containing a dispersion of particles of solid lubricant.

15 Claims, 3 Drawing Sheets

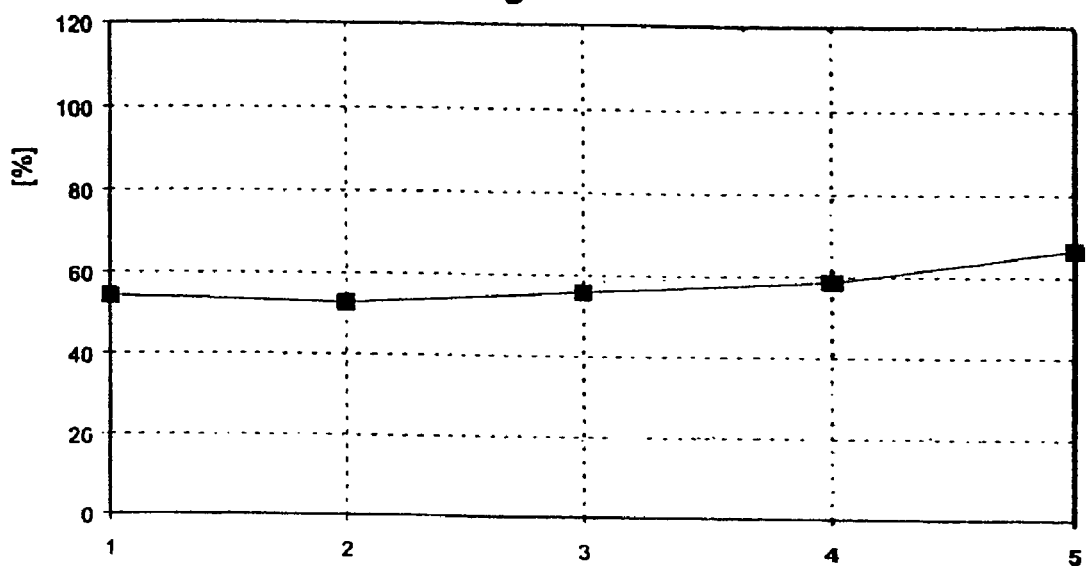
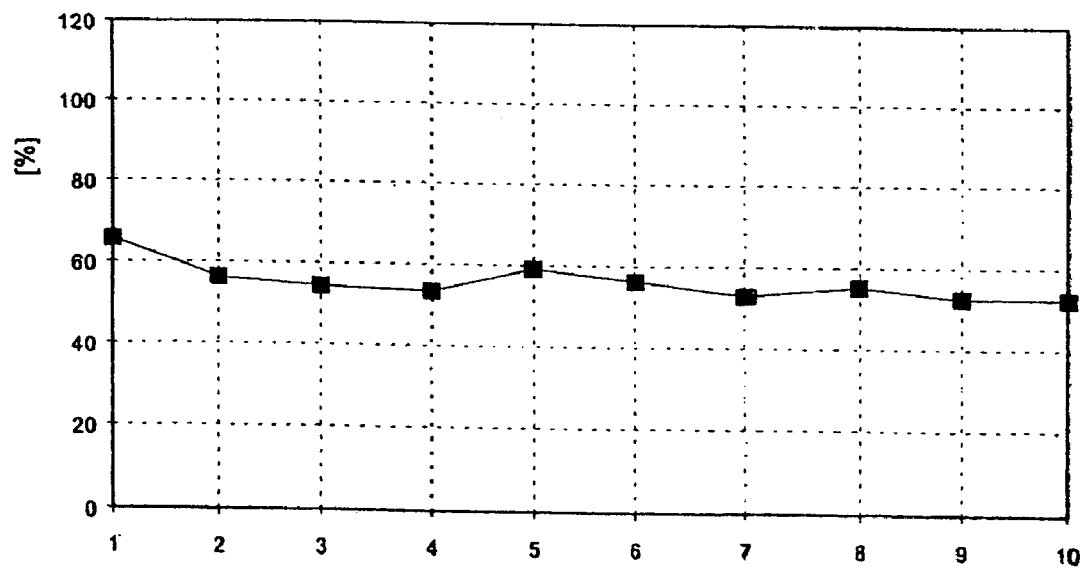
Figure 6

THREADED PIPE WITH SURFACE TREATMENT

BACKGROUND OF THE INVENTION

1. Field of Invention

The present invention relates to a threaded pipe, particularly adapted for forming a threaded joint to join pipe segments into strings used in the oil and gas extraction industry, provided with a surface protection of the threaded portion to increase its corrosion and galling resistance properties. Moreover, the present invention relates to a process for making the dry surface protection of the threaded pipe to increase corrosion and galling resistance thereof.

2. Brief Description of the Prior Art

In the oil fields it is common practice to use metallic pipes of a predefined length, joined to form such a string to reach the depth in which there are oil or gas reservoirs or pools for their extraction.

This extraction technique requires to gradually case the well internally, during its boring, which is performed with metallic tubes, the so-called casing of the well. Once the desired depth is reached, there is placed a string of metallic pipes of smaller diameter, the so-called tubing, to pump the gaseous or liquid hydrocarbons to the surface. Both casing and tubing strings are formed of pipe segments, which are joined together using threaded connectors.

During assembling operation a major problem is the occurrence of galling in threads and other surfaces of the pipes in sliding contact. It is common practice to use dope or grease on the surface of the threads of male and female elements to achieve a make up operation of the connectors avoiding galling. The dope usually employed in this operation has, in its composition, small particles of heavy metals such as Pb or Cu. On the other hand, these metals are hazardous to health and the environment and would be preferably avoided.

In addition to the aforementioned risks, the use of dope entails other operations, i.e. cleaning and doping of the connectors that have to be carried out in the oilfield in often adverse environmental conditions. These undesirable extra tasks are expensive and time consuming.

Another potential risk in the use of dope is the danger of the so-called "overdoping", i.e. the concrete possibility of laying too much dope on the threads of the connectors which has the consequence that, during make up of the connector, the excess of dope cannot be evacuated through the end of the threaded portions of the pipe segments. The trapped dope can thus develop high pressure within the connector, and under circumstances such pressure is able to produce plastic deformation of the pipe segments in the threaded portion and even the collapse of the male member of the joint. Once this fact occurs, the connector is no longer effective and the pipe segments and/or the sleeve must be replaced.

Several surface treatments for solving mainly the problem of galling in threaded connectors for the oil industry are known in the art. Nevertheless, such known solutions do not solve the problems of both assuring high galling resistance during make up operation in the oil field and high corrosion resistance by using dry coatings on the threaded portion of the pipes, this latter feature being necessary for the transport and storage of the pipes in such a way that they are not damaged.

U.S. Pat. No. 4,414,247 discloses a method of coating utilising a resin with a dispersion of particles of solid lubricant. A similar solution, using organic resins deposited over a solid phosphate layer is presented in U.S. Pat. No. 6,027,145. However, in both documents, no corrosion protection is provided by the disclosed solutions. Similarly, the U.S. Pat. No. 4,692,988 does not disclose a method of corrosion protection; additionally, it provides for the use of oil to perform the assembly of the connection, therefore it is not a dry process and also envisages the unwanted extra work of adding oil.

The PCT application WO 02/18522 uses a mixture of oil, thickener and additives to protect against galling. Therefore, the coating process is not dry as such mixture is applied as a wet coating with a controlled viscosity.

The PCT application WOA01/16516 discloses a rust-inhibiting coating to protect the connection against corrosion. This rust-inhibiting coating consists in a layer of oil containing rust inhibitors. However, such layer is applied over the dry lubricant coating, and it is necessary to remove it before assembling the connection in the oilfield, which introduces unwanted extra operation.

SUMMARY OF THE INVENTION

The main object of this invention is to eliminate the above mentioned drawbacks by means of a threaded pipe segment of definite length having a threaded portion, adapted to form threaded joints for pipes, with excellent make up properties and corrosion resistance within the widest range of environmental and operational conditions common nowadays, assuring optimum performance even after several assembling and disassembling operations of the joint composed of pipe segments according to the present invention.

Another object of the present invention is to provide a process for surface treatment of threaded portions of pipe segments of the type mentioned above.

Yet another object of the present invention is to provide a connector composed by pipe segments of the above-mentioned type.

The above mentioned objects and others which will become more evident in view of the following description are achieved, according to the present invention, by means of a pipe segment of definite length for oil extraction industry, which has a central portion with a substantially cylindrical wall and at least a threaded end portion, in which at least the surface of the threading has a surface roughness (Ra) comprised between 2.0 $\mu$m and 6.0 $\mu$m, said surface being covered by a first uniform layer of a dry corrosion inhibiting coating and said first layer being covered by a second uniform layer of dry lubricant coating.

According to a further aspect of the invention the above drawbacks are overcome by means of a process for making a threaded end portion of a metallic pipe for extraction industry either oil or gas having the above characteristics and comprising the steps of:

a) Providing surface roughness (Ra) of the pipe metal at least near the threaded portion with value comprised between 2.0 $\mu$m and 6.0 $\mu$m;

b) Providing a first uniform layer of a dry corrosion inhibiting coating over the pipe metal surface at least near the threaded portion;

c) Providing a second uniform layer of dry lubricant coating over the first uniform layer of coating at least near the threaded portion.

According to a further aspect of the invention the above drawbacks are overcome by means of a process for making a threaded end portion of a metal pipe for extraction industry either oil or gas having the above characteristics and comprising the steps of:

a) Providing surface roughness (Ra) of pipe metal at least near the threaded portion with value comprised between 2.0 µm and 6.0 µm;

b) Providing a first uniform layer of a dry corrosion inhibiting coating containing a dispersion of solid lubricant particles over the pipe metal surface at least near the threaded portion.

In a preferred embodiment, the first layer of dry corrosion inhibiting coating is an epoxy resin containing particles of Zn and has a thickness comprised between 10 and 20 µm, preferably comprised between 10 and 15 µm.

In a further preferred embodiment of the invention, the second layer of dry lubricant coating is made of an inorganic binder and a mixture of particles of solid lubricants, one of which is $MoS_2$ and has a thickness comprised between 10 and 20 µm.

Thanks to these novel features the pipe segments are adapted to be assembled without the necessity of surface preparation or the addition of oil or grease.

By using dry lubricant coatings and dry corrosion inhibitor layers on a threading formed by the connection of tube segments, it is possible to transport and store the pipes in the oilfield without risking that the pipes lose their integrity because of corrosion on the threaded portions forming the connections. The connections composed by pipes treated with the method according to the invention have the further advantage that they can be assembled in the oilfield without removing the corrosion protection layer and without the addition of oil or grease.

An important feature of the invention is that the surface of at least one of the male or female members composing the threaded connection is treated to obtain a surface roughness of 2.0 µm<Ra<6.0 µm. This value of the surface finish is essential for the adhesion of the subsequent coatings. A layer of a dry corrosion inhibiting coating is deposited over the same pipe metal treated surface. Then, a layer of dry lubricant coating is deposited over the corrosion inhibiting coating layer. Alternatively, a single layer of a dry corrosion inhibiting coating containing a dispersion of particles of solid lubricant can be applied over the pipe's treated surface.

According to other particular embodiments of the invention, the desired metal surface roughness can be achieved by several methods, such as abrasive blasting, phosphate coating or other equivalent mechanical or chemical processes.

BRIEF DESCRIPTION OF THE DRAWINGS

The present invention will be now described according to a preferred embodiment thereof, which is given by way of non-limiting example of the scope of the present invention, by means of the accompanying figures where

FIG. 5 is a diagram of the variation of shoulder torque as a function of make up/break out cycles for a first connection A, which is composed of pipes according to the invention, where 100% represents the make up torque.

FIG. 6 is a diagram of the variation of shoulder torque as a function of make up/break out cycles for a second connection B, which is comprised of pipes according to the invention, where 100% represents the make up torque.

DESCRIPTION OF THE PREFERRED
EMBODIMENTS OF THE INVENTION

With reference to the mentioned figures, a pipe according to the present invention will be now described by way of non-limiting example.

Figure 1:
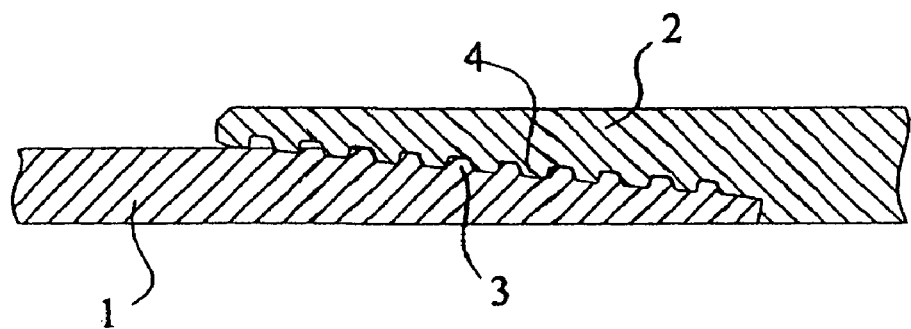
FIG. 1 shows a sectional view along a longitudinal axis of an assembled connection of the type used in the oil and gas extraction industry comprised of two pipe segments according to the invention.
Figure 2:
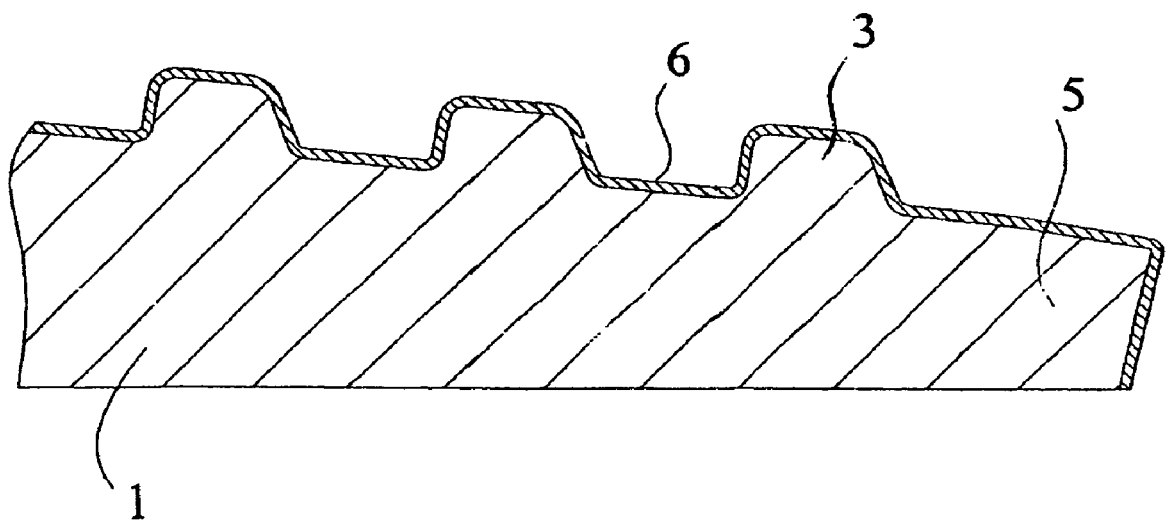
FIG. 2 shows a sectional view of an enlarged detail of the connection of FIG. 1 along a longitudinal axis.

The connection comprises a tube acting as a male component 1, the so-called "pin", provided with an external frusto-conical surface with threading in the end portion, and a female component 2, the so-called "box", provided with an internal corresponding frusto-conical threaded surface provided in the end portion of the box, which generally corresponds to a pipe or a connection sleeve. The male component 1 has external threads 3 and the female component 2 has internal threads 4. The enlargement of the threaded portion 5 of the pipe 1 is shown in FIG. 2, where there is provided a protective layer 6 on the surface of the thread. The threaded portion of the female component 2 can have a perfectly similar shape or it can be made without the protective layer and be connected to a male component provided with the protective layer.

Figure 3:
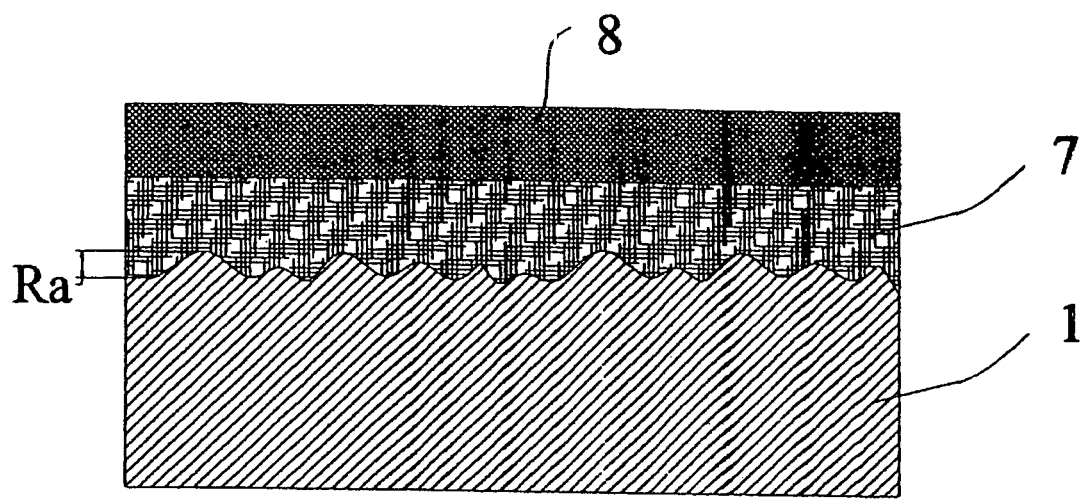
FIG. 3 shows an enlarged view of a detail in greater scale of the surface near the threading of a pipe according to the invention.

A magnification of the composition of the protective layer 6 is shown in FIG. 3 in which, a specific surface roughness Ra of value comprised between 2 and 6 µm, is given to the threaded surface. A first layer 7 of corrosion inhibiting coating, which is comprised of an epoxy resin containing particles of Zn is deposited on the threading metal surface. Advantageously these particles are made of 99% pure Zn. This layer 7 has a thickness of value between 10 and 20 µm. A second layer 8 of dry lubricant coating, which is comprised of a mixture of $MoS_2$ and other solid lubricants in an inorganic binder and has a thickness between 10 and 20 µm, is deposited over the surface of the dry corrosion inhibiting coating 7. The dry corrosion inhibiting coating 7 can be applied by spraying, brushing, dipping or any other method in which the coating thickness can be controlled. The dry lubricant coating 8 can be applied by spraying, brushing, dipping or any other method in which the coating thickness can be controlled once the dry corrosion inhibiting coating 7 is fully dried.

Figure 4:
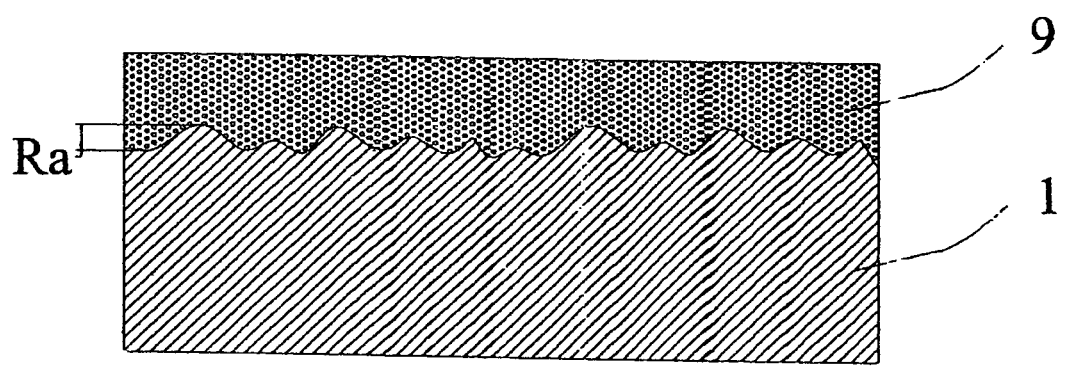
FIG. 4 shows an enlarged view of a detail in greater scale of the surface near the threading of a pipe according to the invention in an alternative embodiment according to the invention.

Another preferred alternative embodiment of the present invention is shown in FIG. 4 in which, the layer of dry corrosion inhibiting coating 7 and the layer of dry lubricant coating 8 of the embodiment of FIG. 3 previously described are combined into one layer 9 of dry corrosion inhibiting coating which has a dispersion of particles of solid lubricant. The thickness of this layer has a value comprised between 10 and 20 µm. The layer of dry corrosion inhibiting coating containing the dispersion of particles of solid lubricant can be applied by spraying, brushing, dipping or any other method in which the coating thickness can be controlled.

Results of tests made on two different examples of pipe connections composed of pipes made according to the invention are given hereafter.

Connection A has an external diameter of the pipe of 139.70 mm and is of the type commercially known as "Premium connection" with metal-to-metal seal and torque shoulder.

Surface preparation: Sand blasting, Ra=3.60 µm.

The dry corrosion inhibiting coating 7 is a Zn-containing epoxy resin, and the dry lubricant coating 8 is composed of an inorganic binder with $MoS_2$ and solid lubricants.

The number of make up and break out cycles is 5, and cleaning and inspection for galling after each break out, and the torque-turn graphs and the friction factor evaluation have been carried out.

In this case, tests have given as result that there is no galling neither on seal nor on thread and the connection had a very stable make up behaviour. These results correspond to the graph curve of FIG. 5, where the curve represent the shoulder torque, i.e. the moment necessary for the male point to contact the female shoulder, compared with the total make up moment.

b) Connection B has an external diameter of the pipe of 88.90 mm and is of the type commercially known as "Premium connection" with metal-to-metal seal and torque shoulder.

Surface preparation: Sand blasting, Ra=3.90 µm.

The dry corrosion inhibiting coating 7 is a Zn-containing epoxy resin, and the dry lubricant coating 8 is composed of an inorganic binder with $MoS_2$ and solid lubricants.

The number of make up and break out cycles is 10, and cleaning and inspection for galling after each break out, and the torque-turn graphs and the friction factor evaluation have been carried out.

In this case, tests have given as result that there is no galling neither on seal nor on thread and the connection had a very stable make up behaviour.

These results correspond to the graph curve of FIG. 6 which is similar to that of FIG. 5.

The surface treatment of the invention can be applied to every type of thread and every type of joint either having a cylindrical or frusto-conical shape of the envelope of the peaks of the thread or a combination of both.

The connection of the present invention can be applied to every type of connection, particularly either in cases when the female member is formed at an end portion of a pipe or when a sleeve with two female members at both ends to join two male pipes is used.

From what has been described it is apparent that the invention achieves all the objects set in the preamble.

What is claimed is:

1. A pipe segment (1) of definite length for oil extraction industry made of a metal, having a central portion with a substantially cylindrical wall and at least a threaded end portion (3, 4) covered with a surface protection characterised in that the metal surface in the threaded end portion (3, 4) has a surface roughness (Ra) comprised between 2.0 µm and 6.0 µm, said surface protection being constituted by a first uniform layer (7) of a dry corrosion inhibiting coating made of an epoxy resin containing particles of Zn and a second uniform layer (8) of dry lubricant coating covering said first layer (7).

2. The pipe segment according to claim 1, wherein the first layer (7) has a thickness comprised between 10 and 20 µm.

3. The pipe segment according to claim 1, wherein the second layer (8) is made of an inorganic binder and a mixture of particles of solid lubricants, one of which is molybdenum disulphide.

4. The pipe segment according to claim 3, wherein the second layer (8) has a thickness between 10 and 20 µm.

5. The pipe segment according to claim 1, wherein said threaded end portion is of conical or frusto-conical envelope.

6. The pipe segment according to claim 1, wherein said threaded end portion is of cylindrical envelope.

7. The pipe segment according to claim 5, wherein the pipe is threaded as a male member of a connection.

8. The pipe segment according to claim 5, wherein the pipe is threaded as a female member of a connection.

9. A pipe segment (1, 2) of definite length for the oil or gas extraction industry made of a metal, with a central portion with a substantially cylindrical wall and a threaded end portion (3,4) covered with a surface protection, characterised in that the metal surface of the threaded end portion (3,4) has a surface roughness (Ra) comprised between 2.0 µm and 6.0 µm, and said surface protection is constituted by one uniform layer (9) made of a dry corrosion inhibiting coating containing a dispersion of particles of solid lubricant.

10. The pipe segment according to claim 9, wherein the uniform layer (9) contains a dispersion of particles of molybdenum disulphide.

11. A threaded pipe joint for oil or gas extraction industry made of male and female threaded pipe members with male and female threads respectively, wherein at least one of the pipe members has a pipe segment according to claim 1.

12. A process to make a threaded end portion of a metallic pipe for oil extraction industry with the characteristics according to claim 1, comprising the steps of:
   a) Providing surface roughness (Ra) of the pipe metal at least near the threaded portion with value comprised between 2.0 µm and 6.0 µm;
   b) Providing a first uniform layer (7) of a dry corrosion inhibiting coating over the metal surface at least near the threaded portion;
   c) Providing a second uniform layer (8) of dry lubricant coating over the first uniform layer (7) of corrosion inhibiting coating at least near the threaded portion.

13. The process to make a threaded end portion of a metallic pipe for oil or gas extraction industry with the characteristics according to claim 1, comprising the steps of:
   a) Providing surface roughness (Ra) of the pipe metal at least near the threaded portion with value comprised between 2.0 µm and 6.0 µm;
   b) Providing a first uniform layer (9) of a dry corrosion inhibiting coating containing a dispersion of particles of solid lubricant over the pipe metal surface at least near the threaded portion.

14. The process according to claim 12, wherein the surface roughness (Ra) of the metal is achieved by abrasive blasting.

15. The process according to claim 12, wherein the surface roughness (Ra) of the metal is achieved by depositing a phosphate layer on the metal surface.

* * * * *